United States Patent
Liu

(10) Patent No.: US 9,534,897 B2
(45) Date of Patent: Jan. 3, 2017

(54) HIGH BANDWIDTH CORIOLIS VIBRATORY GYROSCOPE (CVG) WITH IN-SITU BIAS SELF-CALIBRATION

(71) Applicant: The Boeing Company, Chicago, IL (US)

(72) Inventor: John Y. Liu, San Marino, CA (US)

(73) Assignee: THE BOEING COMPANY, Chicago, IL (US)

( * ) Notice: Subject to any disclaimer, the term of this patent is extended or adjusted under 35 U.S.C. 154(b) by 370 days.

(21) Appl. No.: 14/594,978

(22) Filed: Jan. 12, 2015

(65) Prior Publication Data
US 2016/0202060 A1    Jul. 14, 2016

(51) Int. Cl.
| | |
|---|---|
| *G01C 19/56* | (2012.01) |
| *G01C 19/5705* | (2012.01) |
| *G01C 19/5776* | (2012.01) |
| *G01C 19/5726* | (2012.01) |
| *G01C 19/5719* | (2012.01) |

(52) U.S. Cl.
CPC ....... *G01C 19/5705* (2013.01); *G01C 19/5719* (2013.01); *G01C 19/5726* (2013.01); *G01C 19/5776* (2013.01)

(58) Field of Classification Search
CPC ............ G01C 19/5705; G01C 19/5776; G01C 19/5719; G01C 19/5726; G01C 19/5762; G01C 19/5684
USPC .............................. 73/504.04, 504.02, 504.12
See application file for complete search history.

(56) References Cited

U.S. PATENT DOCUMENTS

| | | | |
|---|---|---|---|
| 8,649,999 B1 * | 2/2014 | Sheng | G01P 21/00 702/104 |
| 9,417,067 B1 * | 8/2016 | Liu | G01C 19/5776 |

(Continued)

FOREIGN PATENT DOCUMENTS

| | | |
|---|---|---|
| EP | 2166308 A1 | 3/2010 |
| EP | 2696169 A2 | 2/2014 |

OTHER PUBLICATIONS

Author Unknown, IEEE Standard Specification Format Guide and Test Procedure for Coriolis Vibratory Gyros, IEEE Standards 1431, Dec. 20, 2004, pp. 1-79.

(Continued)

*Primary Examiner* — Helen Kwok
(74) *Attorney, Agent, or Firm* — MH2 Technology Law Group LLP

(57) ABSTRACT

Provided herein is a method for determining a bias-compensated inertial rotation rate of a Coriolis vibratory gyroscope ("CVG"). The method comprises determining an initial mode that the CVG is operating; obtaining average uncompensated inertial rotation rate measurements from a previous mode transition period; obtaining average uncompensated bias measurements from the previous mode transition period; determining a first transition between a AGC mode and a FTR mode of a given axis; calculating a first estimate of bias of the CVG based on the first transition that was determined and the average uncompensated bias measurements from the previous mode transition period; and calculating, by a processor, a first bias-compensated inertial rotation rate of the CVG based on the first bias that was calculated and the average uncompensated inertial rotation rate measurements from a previous mode transition period.

18 Claims, 7 Drawing Sheets

(56) References Cited

U.S. PATENT DOCUMENTS

| | | | | |
|---|---|---|---|---|
| 2008/0229823 A1* | 9/2008 | Beitia | G01C 19/56 | 73/504.12 |
| 2009/0089001 A1* | 4/2009 | Lin | G01C 25/005 | 702/92 |
| 2010/0063763 A1* | 3/2010 | Rozelle | G01C 19/5691 | 702/92 |
| 2011/0066395 A1* | 3/2011 | Judd | G01C 19/56 | 702/104 |
| 2011/0093250 A1* | 4/2011 | Lin | G01C 19/38 | 703/7 |
| 2011/0178707 A1* | 7/2011 | Sachs | G01C 17/38 | 701/472 |
| 2011/0226056 A1* | 9/2011 | Schroeder | G01C 19/56 | 73/504.12 |
| 2012/0203487 A1* | 8/2012 | Johnson | G01P 21/00 | 702/104 |
| 2013/0085699 A1* | 4/2013 | Touchberry | G01C 19/662 | 702/94 |
| 2014/0088906 A1* | 3/2014 | Wilson | G01P 21/00 | 702/104 |
| 2015/0285658 A1* | 10/2015 | Zotov | G01C 19/5776 | 73/1.77 |

OTHER PUBLICATIONS

Extended European Search Report dated Jun. 28, 2016, European Application No. 16150578.9, pp. 1-9.

K. Hayworth, "Continuous Tuning and Calibration of Vibratory Gyroscopes", NASA Tech Brief, vol. 27, No. 10, Oct. 2003, 1 page.

\* cited by examiner

HIGH BANDWIDTH CORIOLIS VIBRATORY GYROSCOPE (CVG) WITH IN-SITU BIAS SELF-CALIBRATION

FIELD

The present disclosure relates generally to Coriolis vibratory gyroscopes and, in particular, to a method and apparatus for electronically compensating for bias in Coriolis vibratory gyroscopes.

BACKGROUND

Gyroscopes are used for measuring and/or maintaining orientation. As used herein, a "gyroscope" is a sensor configured to detect and measure the angular motion of an object relative to an inertial frame of reference. Further, as used herein, an "inertial frame of reference" may be a coordinate system or set of axes that is non-accelerating. In other words, an inertial frame of reference is a frame of reference in which Newton's first law of motion is true. Newton's first law of motion states that the velocity of a body remains constant unless the body is acted upon by an external force.

A Coriolis vibratory gyroscope ("CVG") is configured to be driven to vibrate along a first axis. Vibration along the first axis while the Coriolis vibratory gyroscope is being rotated about a fixed input axis not co-aligned with the drive axis, for example, perpendicular to the drive axis, generates a Coriolis force that induces vibrations along a second axis. These vibrations may be measured and used to determine an angular velocity for the rotation of the Coriolis vibratory gyroscope about the fixed input axis.

However, bias may contribute to the measurements of the angular velocity. Bias may be the error in the measurements due to factors such as, for example, without limitation, temperature, part inconsistencies, and other suitable factors. Calibration of these gyroscopes during manufacturing of the gyroscopes may be less accurate than desired.

For example, calibration of these gyroscopes during manufacturing processes may use test data as compared to substantially real-time data. In particular, these calibration techniques may not take into account the effects of the temperature in the environment in which a gyroscope is being operated and/or inconsistencies that may develop over time from the time at which the gyroscope was manufactured. Further, some currently available systems for compensating for this bias may be unable to reduce the bias from these vibration measurements to within selected tolerances.

Therefore, it would be desirable to have a method and apparatus that takes into account one or more of the issues discussed above as well as possibly other issues.

SUMMARY

In accordance with aspects of the present disclosure, a method for determining a bias-compensated inertial rotation rate of a Coriolis vibratory gyroscope ("CVG") is disclosed. The CVG comprises a vibratory member, a controller, a first actuator coupled to the vibratory member and arranged about a drive axis of the CVG, and a second actuator coupled to the vibratory member and arranged about a sense axis of the CVG, wherein the drive axis and the sense axis are orthogonal to each other in a modal reference frame and wherein a first actuator control signal and a second actuator control signal are operable to be switched between an automatic gain control ("AGC") mode and a force-to-rebalance ("FTR") mode. The method can comprise determining an initial mode that the CVG is operating; obtaining average uncompensated inertial rotation rate measurements from a previous mode transition period; obtaining average uncompensated bias measurements from the previous mode transition period; determining a first transition between a AGC mode and a FTR mode of a given axis; calculating a first estimate of bias of the CVG based on the first transition that was determined and the average uncompensated bias measurements from the previous mode transition period; and calculating, by a processor, a first bias-compensated inertial rotation rate of the CVG based on the first bias that was calculated and the average uncompensated inertial rotation rate measurements from a previous mode transition period.

In some aspects, the method further comprises determining a second transition between the AGC mode and the FTR mode of a given axis; calculating a second estimate of bias of the CVG based on the second transition that was determined and the average uncompensated bias measurements from the previous mode transition period; and calculating a second bias-compensated inertial rotation rate of the CVG based on the second bias that was calculated and the average uncompensated inertial rotation rate measurements from a previous mode transition period.

In some aspects, the method further comprises providing a signal to control transitions between the AGC mode and the FTR mode of a given axis.

In some aspects, the signal is operable to switch the first actuator control signal and the second actuator control signal.

In some aspects, the first bias is calculated based on the FTR measurements from FTR mode operating on the second axis and on the first axis.

In some aspects, a result of the determining the first transition is a transition from the AGC mode to the FTR mode of a given axis, the method further comprises determining an updated estimate of bias by subtracting a new average bias from a last calculated average bias.

In some aspects, a result of the determining the first transition is a transition from the FTR mode to the AGC mode of a given axis, the method further comprises determining an updated estimate of bias by subtracting a last calculated average bias from a new average bias.

In some aspects, the determining an updated bias-compensated inertial rotation rate further comprises subtracting a biased inertial rotation rate from the first estimate of bias that was calculated for the AGC mode.

In some aspects, the determining an updated bias-compensated inertial rotation rate further comprises adding a biased inertial rotation rate to the first estimate of bias that was calculated for the FTR mode.

In some aspects, a Coriolis vibratory gyroscope ("CVG") is disclosed that comprises a vibratory member; a controller; a first actuator electrically coupled to the vibratory member and arranged about a drive axis of the CVG and operable to obtain a control signal from the controller and provide a voltage sufficient to cause and maintain the vibratory member to vibrate in a first mode of oscillation; a second actuator electrically coupled to the vibratory member and arranged about a sense axis of the CVG and operable to detect a voltage based on a second mode of oscillation of the vibratory member caused by a rotation of the CVG about an axis of rotation and to provide a counter-balancing signal sufficient to null the voltage based on the second mode of oscillation, wherein the sense axis is orthogonal to the drive axis in a modal reference frame, wherein the controller is operable to perform the method comprising: determining an initial mode that the CVG is operating; obtaining average uncompensated inertial rotation rate measurements from a previous mode transition period; obtaining average bias measurements from the previous mode transition period; determining a first transition between a AGC mode and a FTR mode; calculating a first estimate of bias of the CVG based on the first transition that was determined and the average bias measurements from the previous mode transition period; and calculating, by a processor, a first bias-compensated inertial rotation rate of the CVG based on the first bias that was calculated and the average uncompensated inertial rotation rate measurements from a previous mode transition period.

In some aspects, the controller is further operable to perform the method comprising: determining a second transition between the AGC mode and the FTR mode of a given axis; calculating a second estimate of bias of the CVG based on the second transition that was determined and the average uncompensated bias measurements from the previous mode transition period; and calculating a second bias-compensated inertial rotation rate of the CVG based on the second bias that was calculated and the average uncompensated inertial rotation rate measurements from a previous mode transition period.

In some aspects, the controller is further operable to perform the method, further comprising providing a signal to control transitions between the AGC mode and the FTR mode of a given axis.

In some aspects, the signal is operable to switch the first actuator control signal and the second actuator control signal.

In some aspects, the first bias is calculated based on the FTR measurements from FTR mode operating on the second axis and on the first axis.

In some aspects, a result of the determining the first transition is a transition from the AGC mode to the FTR mode of a given axis, the method further comprises determining an updated estimate of bias by subtracting a new average bias from a last calculated average bias.

In some aspects, a result of the determining the first transition is a transition from the FTR mode to the AGC mode of a given axis, the method further comprises determining an updated estimate of bias by subtracting a last calculated average bias from a new average bias.

In some aspects, the determining an updated bias-compensated inertial rotation rate further comprises subtracting a biased inertial rotation rate from the first estimate of bias that was calculated for the AGC mode.

In some aspects, the determining an updated bias-compensated inertial rotation rate further comprises adding a biased inertial rotation rate to the first estimate of bias that was calculated for the FTR mode.

DESCRIPTION OF DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
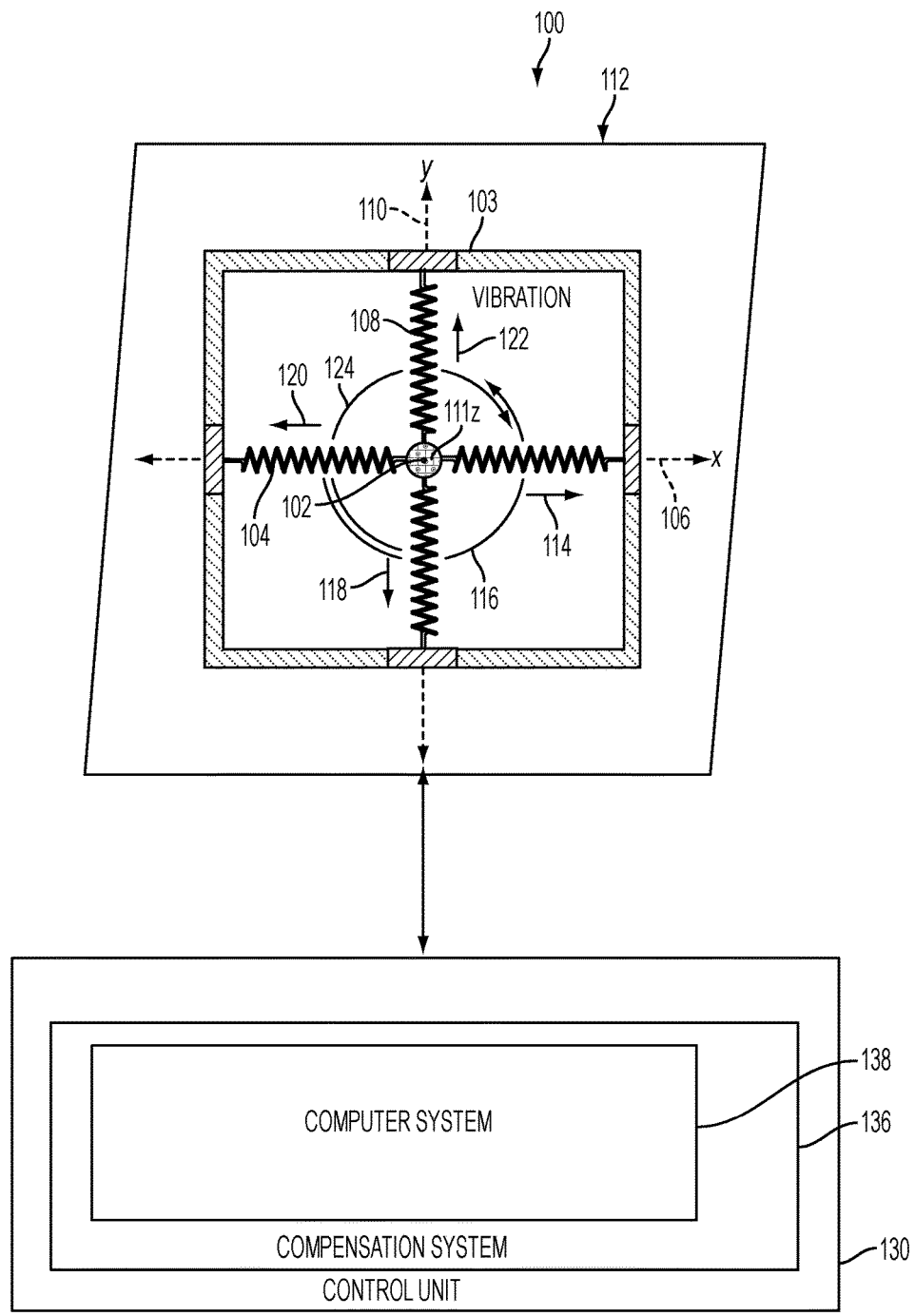
FIG. 1 is an illustration of a functional model for a gyroscope in accordance with an illustrative embodiment.

Reference will now be made in detail to exemplary embodiments of the present teachings, which are illustrated in the accompanying drawings. Where possible the same reference numbers will be used throughout the drawings to refer to the same or like parts.

One of the critical tasks to improve a CVGs performance is mechanical and electronic trimming of the CVG structure. Material non-uniformity, mass property imbalance, structure shape errors, and actuation/sensing device placement errors can all contribute to stiffness asymmetry and principal axis misalignments. Material damping and residual air induced damping asymmetry can contribute to CVG damping asymmetry and principal axis misalignments. Thermal conditions and hysteresis may make those inaccuracies time varying errors and make it hard for a factory calibration alone to be satisfactory. In this patent, we shall exploit some inherent properties of modal switching of a CVG for self-calibration. In particular, we are interested in finding methods for CVG bias in-situ and real-time self-calibration which do not degrade the bandwidth of the CVG.

A typical CVG employs an automatic gain control (AGC) loop to maintain a constant mode vibration while the force-to-rebalance (FTR) loop detects the inertial rate. Various factors contribute to gyro bias which is typically calibrated using external aiding. Accordingly, the present disclosure describes a CVG that uses mode switching (or reversing) of a CVG to reverse the sign of bias from certain contributors and describes a method to simultaneously produce gyro output (sensed inertial rate) at the native CVG bandwidth with self-calibrated bias. The method does not require any external aiding and can be used either during designated gyro calibration time or during in-situ operation and maintains native bandwidth of the Coriolis Vibratory Gyroscope. Generally, the present method for simultaneously producing a gyro output (sensed inertial rate) at the native Coriolis vibratory gyroscope bandwidth with self-calibrated bias will comprising switching between an automatic gain control mode and a force-to-rebalance mode, at predetermined time intervals, calculating a new bias estimate every time when mode switching occurs, and calculating a gyro output using all raw gyro measurements and the new and continuously updated bias estimate.

In general, a gyroscope sensor measures the rate of rotation of the object. Vibrating gyroscopes are typically driven at resonance in order to function as angular rate sensors. This direction is referred as the drive direction. When the device is rotated along the rotation axis, a Coriolis force is induced in the sense direction into resonance mode. The sense direction is orthogonal to both the drive and the rotation axis. Hence the gyroscope can be viewed as two-degrees-of freedom (2 DOF) mass spring damper system whereby, one degree of freedom is the drive direction and the second degree of freedom orthogonal to the first is the sense direction.

With reference now to FIG. 1, an illustration of a functional model for a gyroscope is depicted in accordance with an illustrative embodiment. In this illustrative example, model 100 includes element 102 and frame 103. Of course, in other illustrative examples, model 100 may include other components for the gyroscope in addition to the ones described in FIG. 1.

Element 102 is associated with frame 103 by first set of springs 104 along the direction of x-axis 106. Element 102 is associated with frame 103 by second set of springs 108 along the direction of y-axis 110. As depicted, x-axis 106 and y-axis 110 are used to form plane 112. Element 102 may be configured to vibrate, or resonate, at number of resonant frequencies for element 102. In some cases, number of resonant frequencies may be substantially equal to number of natural frequencies for element 102. A natural frequency in number of natural frequencies may be the frequency at which element 102 vibrates along a particular axis when a substantially continuous external force is not being applied to element 102. In this illustrative example, element 102 may be referred to as a "proof mass" or a resonator in some illustrative examples.

Element 102 may vibrate along x-axis 106 at a first natural frequency. Further, element 102 may vibrate along y-axis 110 at a second natural frequency. The first natural frequency may be the same or different from the second natural frequency, depending on the implementation. Vibration of element 102 along x-axis 106 may be a first mode, while vibration of element 102 along y-axis 110 may be a second mode. The first mode and the second mode may be referred to as, for example, a drive mode and a sense mode, respectively.

Element 102 may vibrate along x-axis 106 and/or y-axis 110 independently of movement of frame 103 in this illustrative example. In particular, first set of springs 104 and second set of springs 108 may allow element 102 to move along x-axis 106 and y-axis 110 independently of the movement of frame 103.

Motion of element 102 is constrained to within plane 112 in this illustrative example. In one illustrative example, control unit 130 may drive element 102 to vibrate along the direction of x-axis 106. Frame 103 may be rotated about a z-axis 111 that is substantially perpendicular to plane 112. Rotation of frame 103 about z-axis 111 while element 102 is moved along the direction of x-axis 106 generates a Coriolis force that causes element 102 to vibrate along the direction of y-axis 110.

For example, referring to FIG. 1, if element 102 is moved in the direction of arrow 114 along x-axis 106 while frame 103 is rotated about z-axis 111 in the direction of arrow 116, element 102 may be moved in the direction of arrow 118 along y-axis 110. If element 102 is moved in the direction of arrow 120 along x-axis 106 while frame 103 is rotated about z-axis 111 in the direction of arrow 116, element 102 may be moved in the direction of arrow 122 along y-axis 110.

Similarly, if element 102 is moved in the direction of arrow 114 along x-axis 106 while frame 103 is rotated about z-axis 111 in the direction of arrow 124, element 102 may be moved in the direction of arrow 122 along y-axis 110. If element 102 is moved in the direction of arrow 120 along x-axis 106 while frame 103 is rotated about z-axis 111 in the direction of arrow 124, element 102 may be moved in the direction of arrow 118 along y-axis 110.

Control unit 130 uses one or more force rebalance signals to cause the amplitude of vibrations of element 102 along second axis, i.e., y-axis 110, to be substantially zero. In other words, control unit 130 uses the one or more force rebalance signals to substantially nullify the movement of element 102 along second axis, i.e., y-axis 110, based on the measured second mode motion due to the Coriolis coupling from the first mode motion. Control unit 130 generates one or more measurements of the one or more force rebalance signals. The one or more measurements of the force rebalance signals may be used to determine an angular velocity.

The one or more measurements may be less accurate than desired when bias of gyroscope contributes to the one or more measurements. Bias is an error for gyroscope. For example, bias can be the difference between the one or more measurements and the one or more measurements that should actually be generated. Bias may be the contribution to the one or more measurements when angular velocity is substantially zero. In this manner, bias may be referred to as a zero-rate bias. Bias may be caused by a number of different factors. These factors may include, for example, without limitation, temperature, inconsistencies in the fabrication of the different components for element 102, characteristics of element 102, characteristics of a sensing system in gyroscope, characteristics of control unit 130, and other suitable factors. These factors also may include damping and stiffness asymmetry between the two principal damping axes and principal stiffness axes, nominal drive axis and sense axis alignment, if different than the first axis and second axis, actuation/pickoff axis misalignments within the drive axis and sense axis, and/or other suitable types of asymmetry.

Compensation system 136 may be used to electronically compensate for the bias. Compensation system 136 may be implemented using hardware, software, or a combination of the two. For example, compensation system 136 may be implemented within computer system 138. Computer system 138 may comprise a number of computers. When computer system 138 comprises more than one computer, these computers may be in communication with each other.

Figure 2:
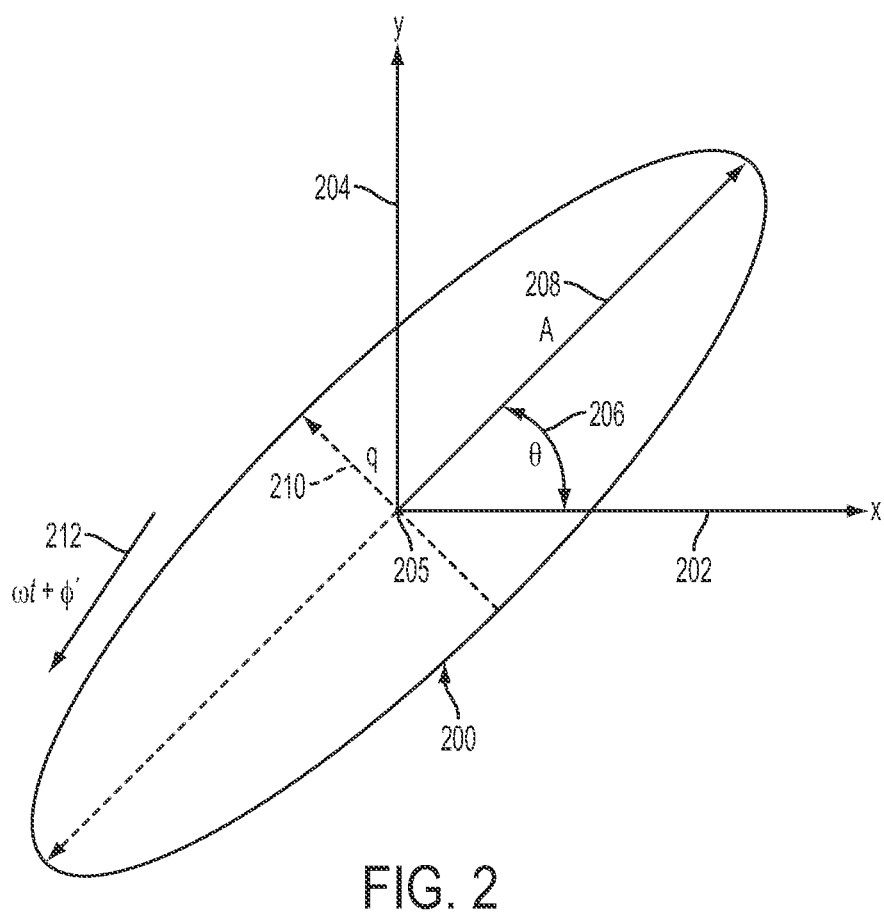
FIG. 2 is an illustration of the orbit of an element for a gyroscope in accordance with an illustrative embodiment.

With reference now to FIG. 2, an illustration of the orbit of an element for a gyroscope is depicted in accordance with an illustrative embodiment. In this illustrative example, orbit 200 of an element, such as element 102 from FIG. 1, is depicted with respect to x-axis 202 and y-axis 204. X-axis 202 is the same as x-axis 106 in FIG. 2. Y-axis is the same as y-axis 110 in FIG. 1.

Element 102 may oscillate about origin 205 at the intersection of x-axis 202 and y-axis 204. Oscillation of element 102 may follow a pendulum-type behavior. In this manner, orbit 200 may be a pendulum orbit in this illustrative example.

Parameters for orbit 200 include pendulum angle 206, principal amplitude 208, quadrature amplitude 210, and phase 212. As depicted, pendulum angle 206, $\sigma$, is an angle with respect to x-axis 202 and defines an axis relative to x-axis 202 along which element 102 may vibrate. Principal amplitude 208, A, is the amplitude of vibrations for element 102 along the axis defined by pendulum angle 206.

Quadrature amplitude 210, q, is the amplitude of vibrations for element 102 along the axis in-quadrature to the axis defined by pendulum angle 206. In other words, quadrature amplitude 210 is the amplitude of vibrations for element 102 along the axis substantially orthogonal to the axis defined by pendulum angle 206. Further, phase 212, $\phi$, is the phase for orbit 200.

A control unit, such as control unit 130 in FIG. 1, may be configured to control external force components applied to element 102 and/or frame 103 in FIG. 1 to control pendulum angle 206, principal amplitude 208, quadrature amplitude 210, and phase 212. For example, the control unit may control forces exerted on element 102 such that these forces have a same phase as the phase of the natural frequency for element 102.

Further, the control unit may control forces exerted on element 102 such that principal amplitude 208, A, remains substantially constant during operation of the gyroscope against any damping forces. The rate at which principal amplitude 208, A, decreases because of damping is proportional to A/$\tau$, in which $\tau$ is a damping time constant. Additionally, the control unit may control the forces exerted on element 102 such that pendulum angle 206 and quadrature amplitude 210 remain substantially zero with selected tolerances during operation of the gyroscope.

Figure 3:
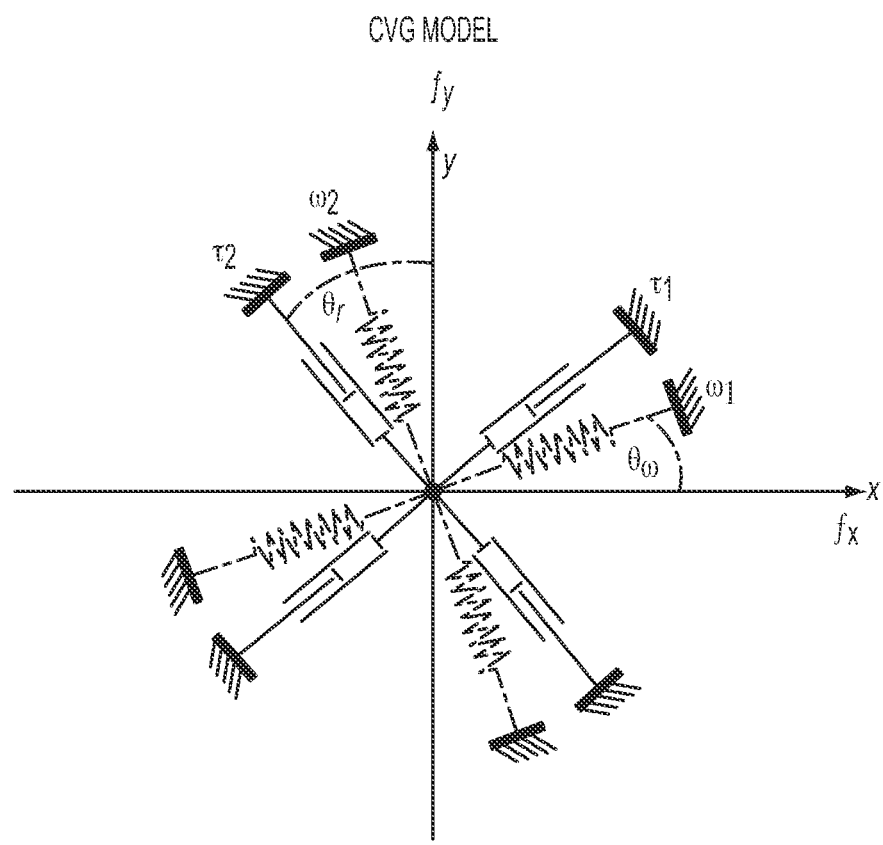
FIG. 3 shows an example CVG model, according to the present teachings.

FIG. 3 shows an example CVG model according to the present teachings. A first coordinate system (+x to the right, +y upward, +z out of the page (axis of rotation). The CVG model is shown represented in modal space (aka modal reference frame or modal coordinate system) with modal coordinates (aka generalized or principal coordinates) where the vibration mode about the drive (x-axis), $\omega_1$, and the vibration mode produced as a result of the rotation of the CVG about the sense (y-axis), $\omega_2$, are offset by 90°. In physical space (not shown) the two modes of vibration, $\omega_1$ and $\omega_2$, would be offset by 45°. For example, the nominal axes of the drive and sense axes can be defined as the pickoff axes of the drive and sense axes. As discussed above, the CVG can be represented as a 2 DOF mass spring damper system. Because of the damped system (represented by $\tau_1$ and $\tau_2$), the CVG requires an input force to maintain the vibrating member of the CVG vibrating in a constant vibration mode. The actuators around the drive axis provide this needed input. With closed-loop FTR control, the actuators around the sense axis contain information related to the angular speed. While the CVG is not undergoing rotation about the z-axis, the vibration of the vibrating member tends to stay in $\omega_1$ direction. However, if the CVG rotates, the vibration in $\omega_1$ direction tends to get coupled into $\omega_2$ direction, which can then be detected by a sensor located around the sense axis. Additionally or alternatively, the rotation rate can be measure by a process whereby a control signal is provided to zero out the $\omega_2$ motion (force to rebalance) that is opposite the force in the $\omega_2$ direction. The CVG can be designed such that $\omega_1$ and $\omega_2$ are made to be as close as possible during manufacture, such as about within 5%, or within 3%, or within 2%, or within 1% of each other. Because of inherent difficulties in the arrangement of the various actuators in the CVG, the force for the AGC ($f_x$) provided to the actuators is offset from the pickoff direction of the drive axis, as shown in FIG. 3. Likewise, the FTR ($f_y$) is also offset from the pickoff direction of the sense axis, as also shown in FIG. 3

Figure 4A:
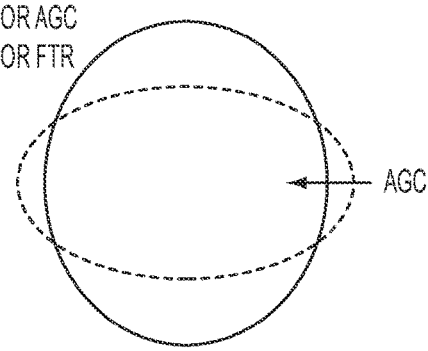
FIGS. 4A-4D show an example mode switching for the drive and sense axes of the CVG that can be used to correct for $2^{nd}$ mode actuation/pickoff misalignment, according to the present teachings.
Figure 4B:
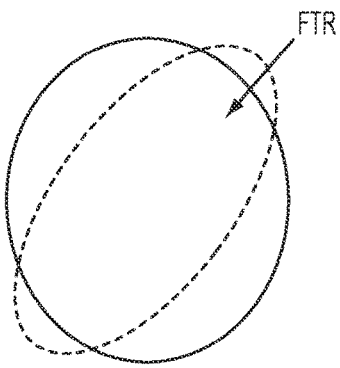
Figure 4C:
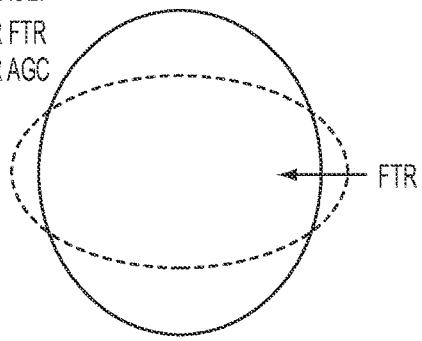
Figure 4D:
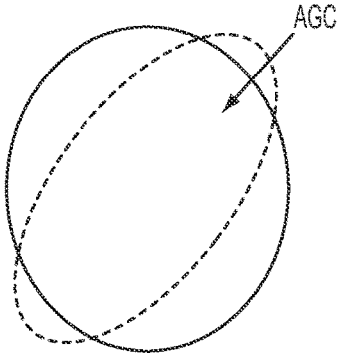

FIGS. 4A-4D show an example mode switching for the drive and sense axes of the CVG that can be used to estimate bias, according to the present teachings. FIG. 4A shows the first vibration mode $\omega_1$ (AGC) along the drive axis and FIG. 4B show the second vibration mode $\omega_2$ (FTR) along the sense axis. The control signal provided to the actuator along the drive axis and the actuator along the sense axis can be reversed, such that the second mode of vibration $\omega_2$ (FTR) is along the drive axis, as shown in FIG. 4C, and the first mode of vibration $\omega_1$ is along the sense axis, as shown in FIG. 4D.

Figure 5A:
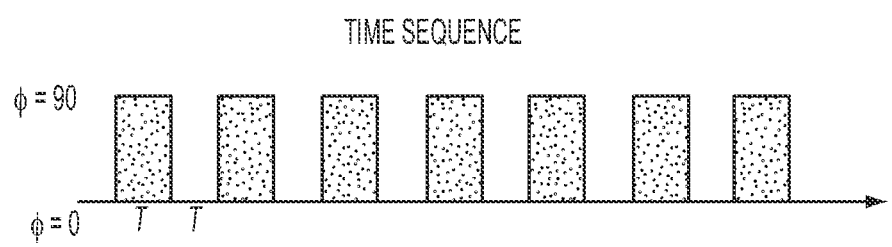
FIGS. 5A-5C shows an example time sequence for the mode switching, according to the present teachings.
Figure 5B:
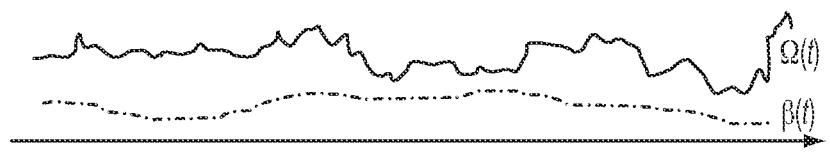
Figure 5C:
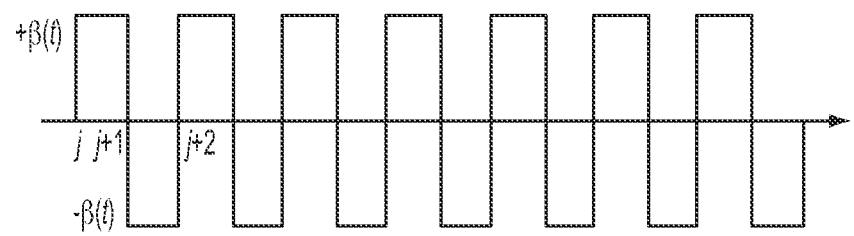

FIGS. 5A-5C shows an example time sequence for the mode switching, according to the present teachings. In FIG. 5A, a time sequence is shown as a square wave that transitions between a first mode, i.e., ACG mode, represented by $\phi=0$, and a second mode, i.e., FTR mode, represented by $\phi=90$. For the first operation mode, the x-axis is operating as the drive axis, controlled by the AGC loop and the y-axis is operating as the sense axis, controlled by the FTR loop. For the second operation mode, the y-axis is operating as the drive axis, controlled by the AGC loop and the x-axis is operating as the sense axis, controlled by the FTR loop. The time period in each mode, T, is the same for each mode (in general they can be different). In FIG. 5B, a plot of the inertial rotation rate, $\Omega(t)$, and the bias, $\beta(t)$, is shown along the time axis of FIG. 5A. The bias, $\beta(t)$, tends to be a parameter that varies more slowing in time. In FIG. 5C, a plot of the bias, $\beta(t)$, is shown between a value of $+\beta(t)$ and $-\beta(t)$ versus a mode transition count value, j.

Figure 6:
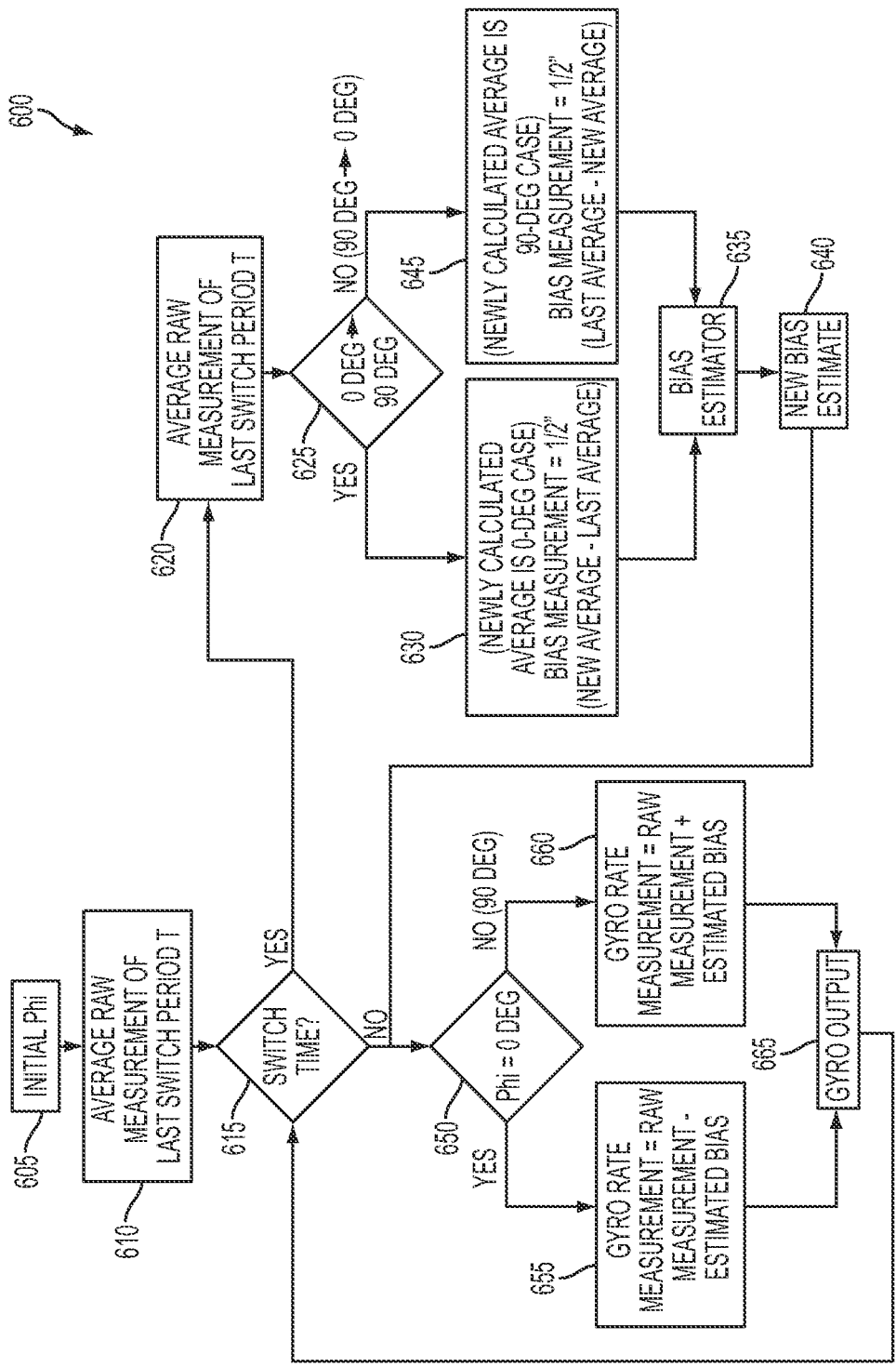
FIG. 6 shows an example method for determining the gyroscope output using mode switching to determine the bias of the gyroscope, according to the present teachings.

FIG. 6 shows an example method for determining the gyroscope output using mode switching to determine the bias of the gyroscope. The method 600 begins at 605 where the initial $\phi$ is obtained. At 610, the average raw measurement of last switch period T is obtained. At 615, a determination is made as to whether a switch time has occurred. If the determination at 615 is positive, then the method proceeds to 620 where the average raw measurement of last switch period T is obtained. At 625, a determination is made as to whether the switch is from 0° to 90°. If the determination is positive at 625, then the method proceeds to 630 where the (newly calculated average is 0° case) bias measurement equals ½*(new average−last average), which is provided to the bias estimator at 635 and a new bias is estimated at 640. If the determination is negative at 625, meaning that the switch was from 90° to 0°, then the method proceeds to 645 where (newly calculated average is 90° case) bias measurement=½*(last average−new average), which is provided to the bias estimator at 635 and a new bias is estimated at 640. If the determination at 615 is negative, the new bias estimate from 640 is provided as input to the determination as to whether $\phi=0°$ at 650. If the determination at 650 is positive, then the gyro rate measurement=raw measurement−estimated bias at 655. If the determination at 650 is negative, then the gyro rate measure=raw measurement+estimated bias at 660. The result of either 655 or 660 is then provided as the gyro output at 665, which is provided as an input to the determination of switch time at 615.

Figure 7:
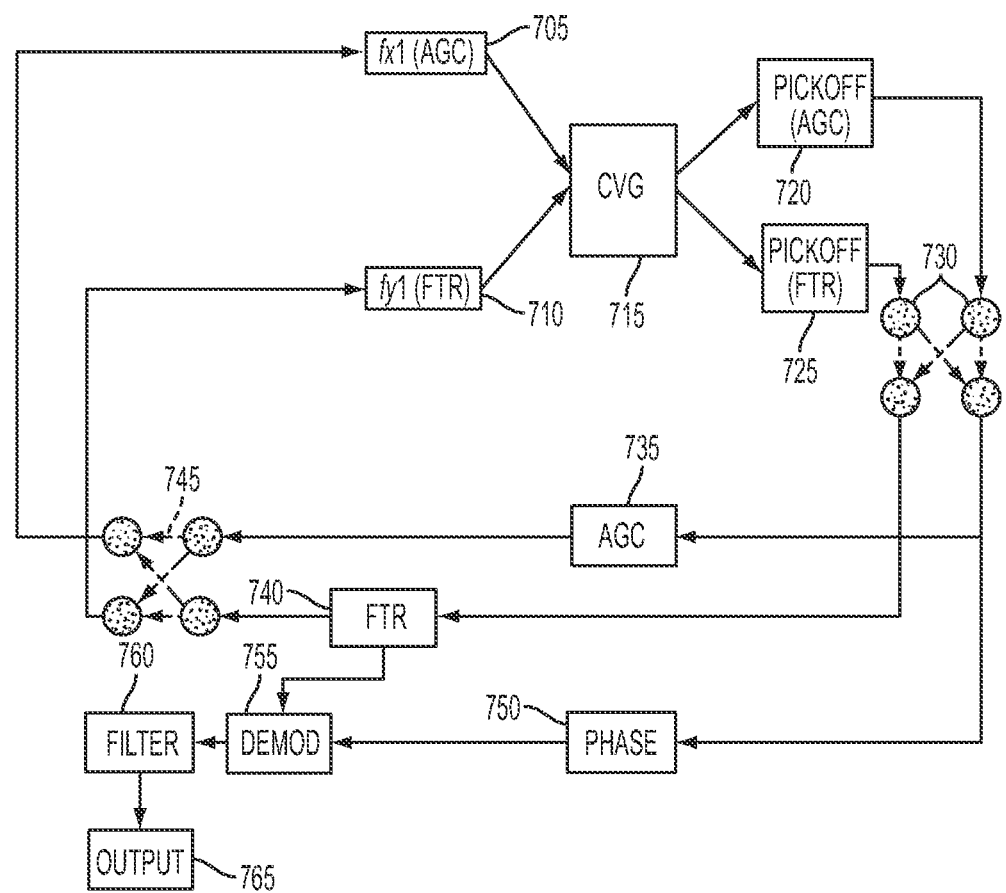
FIG. 7 shows an example closed loop control loop for CVG control to provide mode switch to bias compensation, according to the present teachings.

FIG. 7 shows an example closed loop control loop for CVG control to provide mode switch to bias compensation, according to the present teachings. The CVG receives a first of input related to the automatic gain control ("AGC") mode that is applied to a first actuator to maintain the vibrating member of the CVG to vibrate at a constant amplitude in a first vibration mode ($\omega_1$) and a second input related to the force to rebalance ("FTR") mode that is applied to a second actuator to offset the force due to the Coriolis effect caused by rotation of the CVG about the z-axis (axis of rotation).

The first input 705, is a voltage that is applied to a drive actuator to produce a force to cause vibrating member of CVG 715 to vibrate in a first vibration mode ($\omega_1$). The second input 710 is a voltage that is applied to a sense actuator to produce a force to counter the force produce by the Coriolis effect that causes vibrating member to vibrate in a second vibration mode ($\omega_2$) when subject to a rotation about the z-axis. A voltage 720 is measured at the pickoff for the drive axis and is provided to AGC 735 to be provided as input in 705. A voltage 725 is measured at the pickoff for the sense axis and is provided to FTR 740 to be provided as inputs in 710. A first switch 730 and a second switch 745 can be arranged between to receive and switch the voltages 720 and 725 that are outputted to provide the mode switching functionality. If the phase of the voltage 720 measured at the pickoff for the drive axis is out of phase, a phase module 750 can correct for phase offsets in the voltage. Demodulation module 755 obtains the phase information from phase module 750 and the voltage from FTR 740 to produce a demodulated voltage that is then filtered by filter 760. The angular velocity of the CVG can then be obtained and outputted 765.

In operation, a first control signal can be obtained from a controller to provide a voltage sufficient to cause and maintain the vibratory member to vibrate in a first mode of oscillation. A voltage can then be detected based on a second mode of oscillation of the vibratory member caused by a rotation of the CVG about an axis of rotation. A counter-balancing signal can then be provided that is sufficient to null the voltage based on the second mode of oscillation. A rate of the rotation of the CVG can then be determined based, in part, on the counter-balancing voltage.

The rate bias with switchable drive/pickoff directions can be determined as follows. The rate measurement bias formula can be determined in the case of frequency and damping asymmetries. If we introduce a rotation angle of drive/pickoff axes as follows:

$$\begin{bmatrix} x_s \\ y_s \end{bmatrix} = \begin{bmatrix} \cos\varphi & \sin\varphi \\ -\sin\varphi & \cos\varphi \end{bmatrix} \begin{bmatrix} x \\ y \end{bmatrix} = M^{-1}(\varphi) \begin{bmatrix} x \\ y \end{bmatrix} \quad (1)$$

and introduce the corresponding control inputs constructed from the rotated measurement signals as $$\begin{bmatrix} f_{x_s} \\ f_{y_s} \end{bmatrix} = M^{-1}(\varphi) \begin{bmatrix} f_x \\ f_y \end{bmatrix} \quad (2)$$

The rotated two-dimensional vibratory equations with the rotated control inputs become $$\begin{bmatrix} \ddot{x}_s \\ \ddot{y}_s \end{bmatrix} + \begin{bmatrix} \omega_x^2 & 0 \\ 0 & 0 \end{bmatrix} \begin{bmatrix} x_s \\ y_s \end{bmatrix} + M^{-1}(\varphi)DM(\varphi) \begin{bmatrix} \dot{x}_s \\ \dot{y}_s \end{bmatrix} + \left( M^{-1}(\varphi)SM(\varphi) - \begin{bmatrix} \omega_x^2 & 0 \\ 0 & 0 \end{bmatrix} \right) \begin{bmatrix} x_s \\ y_s \end{bmatrix} = \begin{bmatrix} f_{x_s} \\ f_{y_s} \end{bmatrix} \quad (3)$$

where matrices D and S are defined as the damping and stiffness matrices of the asymmetric vibratory dynamics $$\begin{bmatrix} \ddot{x} \\ \ddot{y} \end{bmatrix} + \underbrace{\begin{bmatrix} \frac{2}{\tau} + \Delta\left(\frac{1}{\tau}\right)\cos 2\theta_\tau & \Delta\left(\frac{1}{\tau}\right)\sin 2\theta_\tau \\ \Delta\left(\frac{1}{\tau}\right)\sin 2\theta_\tau & \frac{2}{\tau} - \Delta\left(\frac{1}{\tau}\right)\cos 2\theta_\tau \end{bmatrix}}_{D(\tau, \Delta(\frac{1}{\tau}), \theta_\tau)} \begin{bmatrix} \dot{x} \\ \dot{y} \end{bmatrix} + \underbrace{\begin{bmatrix} \omega^2 - \omega\Delta\omega\cos 2\theta_\omega & -\omega\Delta\omega\sin 2\theta_\omega \\ -\omega\Delta\omega\sin 2\theta_\omega & \omega^2 + \omega\Delta\omega\cos 2\theta_\omega \end{bmatrix}}_{S(\omega, \Delta\omega, \theta_\omega)} \begin{bmatrix} x \\ y \end{bmatrix} = M(\varphi) \begin{bmatrix} f_{x_s} \\ f_{y_s} \end{bmatrix}$$

Following the same perfect AGC and FTR loops argument, we have $$f_{y_s}(\varphi) = \Delta\left(\frac{1}{\tau}\right)\sin(2\varphi - 2\theta_\tau)\dot{x}_s - \omega\Delta\omega\sin(2\varphi - 2\theta_\omega)x_s \quad (4)$$

One immediate observation is $$f_{y_s}(0°) = -f_{y_s}(90°) \quad (5)$$

This implies if the drive and pickoff modes are reversed, the bias of a CVG reverses its sign as well, first observed in the reference "K. Hayworth, "Continuous tuning and calibration of vibratory gyroscopes," NASA Tech Brief, Vol. 27, No. 10, 2003."

The sign switch leads to the possibility of a self-calibration scheme that estimate the bias at the CVG level without any external aiding.

Real-Time Rate Bias Self-Calibration

Consider the non-zero inertial rate case of (3). Straightforward algebraic manipulation, with the assumption of the perfect AGC and FTR, coupled with drive/pickoff rotation angle, leads to the following FTR formula:

$$f_{y_s}(\varphi) = -\left[2k\Omega - \Delta\left(\frac{1}{\tau}\right)\sin(2\varphi - 2\theta_\tau)\right]c_0\omega_x\sin(\omega_x t) + \omega\Delta\omega\sin(2\varphi - 2\theta_\omega)c_0\cos(\omega_x t) = F_P(\varphi) + F_Q(\varphi) \quad (6)$$

The low-pass filtered modulated (by vibratory motion rate signal $\dot{x}_s$) FTR signal becomes $$FTR_m(\varphi) = LP(f_{y_s}\dot{x}_s) = \quad (7)$$
$$LP[F_P(\varphi)\dot{x}_s + F_Q(\varphi)\dot{x}_s] = \frac{1}{2}\left[2k\Omega - \Delta\left(\frac{1}{\tau}\right)\sin(2\varphi - 2\theta_\tau)\right]c_0^2\omega_x^2$$

The measured inertial rate can be extracted as the combination of the rate estimate and a bias term:

$$\Omega = \frac{FTR_m(\varphi)}{kc_0^2\omega_x^2} + \frac{1}{2k}\Delta\left(\frac{1}{\tau}\right)\sin(2\varphi - 2\theta_\tau) = \hat{\Omega} + b(\varphi) \quad (8)$$

where $$b(\varphi) = \begin{cases} -\frac{1}{2k}\Delta\left(\frac{1}{\tau}\right)\sin(2\theta_\tau) = \beta & \forall\ \varphi = 0° \\ +\frac{1}{2k}\Delta\left(\frac{1}{\tau}\right)\sin(2\theta_\tau) = -\beta & \forall\ \varphi = 90° \end{cases} \quad (9)$$

As both the damping asymmetry and damping axis misalignment are inherently properties of CVG structure layout of CVG and vacuum conditions that may be subjected to the influence of thermal and shape variations, the characteristics of the sign flip of the bias with mode angle switch between drive and pickoff axes leads to the following filter based estimator for inertial rate estimate with real-time bias self-calibration.

Assume the bias term is slowly varying and can be modeled as Markov process. With modal reversing technique, assume an equal 0-degree and 90-degree switching angle φ period of length T. The inertial rate measurement bias can be largely eliminated if the average two consecutive 0° and 90° measurements are used. There are many drawbacks of the averaging approach, including the much reduced bandwidth of the gyro sensor because of the required time of 2T for averaging and reduced accuracy of the gyro due to the neglected bias variations within a particular T period and between the two consecutive switching periods. To overcome these drawbacks, a filter based estimator can be proposed that continuously makes use of all measurements within both the 0° and 90° periods. As an example, assume that the bias can be modeled as a Markov process $$\frac{d\beta(t)}{dt} = -\frac{1}{p}\beta(t) + \eta \quad (10)$$

where $\beta(t)$ is the (time-varying) sign-invariant true bias defined in (9), p is the process time constant, and $\eta$ is the zero-mean Gaussian white noise with known variance, i.e. $\text{var}[\eta]=Q$. The corrected inertial rate measurement at sample time $t_k$ is given by $$\hat{\Omega}_k = \begin{cases} \Omega_k - \bar{\beta}_k & \forall \varphi = 0° \\ \Omega_k + \bar{\beta}_k & \forall \varphi = 90° \end{cases} \quad (11)$$

The time sequence of the measurements from the CVG can be arranged as follows to have a new sample at the end of each switching period of T as follows. Assume that $t_0$ is the start of a 90-degree $\phi$ angle switching period. We have $$\begin{cases} \varphi(t_k) = 90° & \forall t_k \in [t_0, t_0+T] = U_1 \\ \varphi(t_k) = 0° & \forall t_k \in [t_0+T, t_0+2T] = U_2 \\ \varphi(t_k) = 90° & \forall t_k \in [t_0+2T, t_0+3T] = U_3 \\ \vdots & \vdots \end{cases} \quad (12)$$

We can arrange the measurements of the bias at the end of each switching period as follows:

$$\begin{cases} \beta_1 = +\frac{\overline{\Omega}(t_k \in U_2) - \overline{\Omega}(t_k \in U_1)}{2}, & t_k = t_0+2T \\ \beta_2 = +\frac{\overline{\Omega}(t_k \in U_2) - \overline{\Omega}(t_k \in U_1)}{2}, & t_k = t_0+3T \\ \vdots & \vdots \end{cases} \quad (13)$$

An estimator of the bias based on the bias measurement samples can then be constructed. Denote $\bar{\beta}_j$ as the estimate of the bias at $t_k=t_0+(j+1)T$. The predict of the bias at this time is $$\overline{\beta_j^-} = \bar{\beta}_{j-1} - \frac{T}{p}\bar{\beta}_{j-1} = \left(1-\frac{T}{p}\right)\bar{\beta}_{j-1} \quad (14)$$

The measurement update of the bias is $$\bar{\beta}_j = \bar{\beta}_j^- + K_j(\beta_j - \bar{\beta}_j^-) \quad (15)$$

where $K_j$ can be the update gain from either a fixed filter or a Kalman filter. For a Kalman filter design, the predicted covariance of the bias is $$P_j^- = \left(1-\frac{T}{p}\right)^2 P_j^- + Q_j \quad (16)$$

The updating gain can be calculated as $$K_j = P_j(P_j+R_j)^{-1} \quad (17)$$

and the updated covariance is give by $P_{j+1}^- = (1-K_j)P_j$. The process noise variance Q and the measurement noise variance R can be determined by analyzing the raw data and the measurement process in the actual implementation quality of AGC and FTR loops.

With a filter based bias estimator, as long as the bias time constant is longer than the bias measurement sample period, the gyro measurement output can be still at high rate with the bias corrected. The perfect case is when the gyro is at standstill (lab environment or sometime during operation) at which the true inertial rate is a constant. In this case, averages yield perfect bias estimation. In general case, the dynamic truth rate may corrupt the averages and renders the bias estimate less accurate.

The steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining a bias-compensated inertial rotation rate of a Coriolis vibratory gyroscope ("CVG"), the method comprising:
   determining an initial mode that the CVG is operating, wherein the initial mode is either an automatic gain control mode or a force-to-rebalance mode that is orthogonally offset from the automatic gain control mode;
   obtaining average uncompensated inertial rotation rate measurements from a previous mode transition period;
   obtaining average uncompensated bias measurements from the previous mode transition period;
   determining a first transition between the automatic gain control mode and the force-to-rebalance mode of a given axis;
   calculating a first estimate of bias of the CVG based on the first transition that was determined and the average uncompensated bias measurements from the previous mode transition period; and
   calculating, by a processor, a first bias-compensated inertial rotation rate of the CVG based on the first estimate of bias that was calculated and the average uncompensated inertial rotation rate measurements from the previous mode transition period.

2. The method of claim 1, further comprising:
   determining a second transition between the automatic gain control mode and the force-to-rebalance mode of a given axis;
   calculating a second estimate of bias of the CVG based on the second transition that was determined and the average uncompensated bias measurements from the previous mode transition period; and
   calculating a second bias-compensated inertial rotation rate of the CVG based on the second estimate of bias that was calculated and the average uncompensated inertial rotation rate measurements from the previous mode transition period.

3. The method of claim 1, further comprising providing a signal to control transitions between the automatic gain control mode and the force-to-rebalance mode of a given axis.

4. The method of claim 3, wherein the signal is operable to switch a first actuator control signal and a second actuator control signal.

5. The method of claim 1, wherein the first estimate of bias is calculated based on one or more force-to-rebalance measurements from the force-to-rebalance mode operating on a drive axis and on a sense axis.

6. The method of claim 1, wherein a result of the determining the first transition is a transition from the automatic gain control mode to the force-to-rebalance mode of a given axis, the method further comprises determining an updated estimate of bias by subtracting a new average bias from a last calculated average bias.

7. The method of claim 1, wherein a result of the determining the first transition is a transition from the force-to-rebalance mode to the automatic gain control mode of a given axis, the method further comprises determining an updated estimate of bias by subtracting a last calculated average bias from a new average bias.

8. The method of claim 1, wherein the calculating the first bias-compensated inertial rotation rate further comprises subtracting a biased inertial rotation rate from the first estimate of bias that was calculated for the automatic gain control mode.

9. The method of claim 1, wherein the calculating the first bias-compensated inertial rotation rate further comprises adding a biased inertial rotation rate to the first estimate of bias that was calculated for the force-to-rebalance mode.

10. A Coriolis vibratory gyroscope ("CVG") comprising:
a vibratory member;
a controller;
a first actuator electrically coupled to the vibratory member and arranged about a drive axis of the CVG and operable to obtain a control signal from the controller and provide a voltage sufficient to cause and maintain the vibratory member to vibrate in a first mode of oscillation;
a second actuator electrically coupled to the vibratory member and arranged about a sense axis of the CVG and operable to detect a voltage based on a second mode of oscillation of the vibratory member caused by a rotation of the CVG about an axis of rotation and to provide a counter-balancing signal sufficient to null the voltage based on the second mode of oscillation, wherein the sense axis is orthogonal to the drive axis in a modal reference frame,
wherein the controller is operable to perform a method comprising:
determining an initial mode that the CVG is operating, wherein the initial mode is either an automatic gain control mode or a force-to-rebalance mode that is orthogonally offset from the automatic gain control mode;
obtaining average uncompensated inertial rotation rate measurements from a previous mode transition period;
obtaining average bias measurements from the previous mode transition period;
determining a first transition between the automatic gain control mode and the force-to-rebalance mode;
calculating a first estimate of bias of the CVG based on the first transition that was determined and the average bias measurements from the previous mode transition period; and
calculating, by a processor, a first bias-compensated inertial rotation rate of the CVG based on the first estimate of bias that was calculated and the average uncompensated inertial rotation rate measurements from the previous mode transition period.

11. The CVG of claim 10, wherein the controller is further operable to perform the method comprising:
determining a second transition between the automatic gain control mode and the force-to-rebalance mode of a given axis;
calculating a second estimate of bias of the CVG based on the second transition that was determined and an average uncompensated bias measurements from the previous mode transition period; and
calculating a second bias-compensated inertial rotation rate of the CVG based on the second estimate of bias that was calculated and the average uncompensated inertial rotation rate measurements from the previous mode transition period.

12. The CVG of claim 10, wherein the controller is further operable to perform the method, further comprising providing a signal to control transitions between the automatic gain control mode and the force-to-rebalance mode of a given axis.

13. The CVG of claim 12, wherein the signal is operable to switch the signal to control the transitions between the automatic gain control mode and the force-to-rebalance mode.

14. The CVG of claim 10, wherein the first estimate of bias is calculated based on one or more force-to-rebalance measurements from the force-to-rebalance mode operating on the drive axis and on the sense axis.

15. The CVG of claim 10, wherein a result of the determining the first transition is a transition from the automatic gain control mode to the force-to-rebalance mode of a given axis, the method further comprises determining an updated estimate of bias by subtracting a new average bias from a last calculated average bias.

16. The CVG of claim 10, wherein a result of the determining the first transition is a transition from the force-to-rebalance mode to the automatic gain control mode of a given axis, the method further comprises determining an updated estimate of bias by subtracting a last calculated average bias from a new average bias.

17. The CVG of claim 10, wherein the calculating the first bias-compensated inertial rotation rate further comprises subtracting a biased inertial rotation rate from the first estimate of bias that was calculated for the automatic gain control mode.

18. The CVG of claim 10, wherein the calculating the first bias-compensated inertial rotation rate further comprises adding a biased inertial rotation rate to the first estimate of bias that was calculated for the force-to-rebalance mode.

* * * * *